(12) United States Patent
Leschnik et al.

(10) Patent No.: US 10,384,638 B2
(45) Date of Patent: Aug. 20, 2019

(54) HOOD HINGE FOR A MOTOR VEHICLE

(71) Applicant: GM GLOBAL TECHNOLOGY OPERATIONS LLC, Detroit, MI (US)

(72) Inventors: Steffen Karl Leschnik, Ruesselsheim (DE); Wolfgang Rasel, Ruesselsheim (DE); Christian Pietrasch, Ruesselsheim (DE); Bernd Klein, Ruesselsheim (DE)

(73) Assignee: GM Global Technology Oeprations LLC, Detroit, MI (US)

( * ) Notice: Subject to any disclaimer, the term of this patent is extended or adjusted under 35 U.S.C. 154(b) by 162 days.

(21) Appl. No.: 15/682,663

(22) Filed: Aug. 22, 2017

(65) Prior Publication Data
US 2018/0056928 A1    Mar. 1, 2018

(30) Foreign Application Priority Data
Aug. 25, 2016    (DE) .......................... 10 2016 010 315

(51) Int. Cl.
| | |
|---|---|
| *B60R 21/38* | (2011.01) |
| *E05D 7/04* | (2006.01) |
| *E05D 11/00* | (2006.01) |

(52) U.S. Cl.
CPC ............... *B60R 21/38* (2013.01); *E05D 7/04* (2013.01); *E05D 11/00* (2013.01); *E05D 2007/0461* (2013.01); *E05D 2011/009* (2013.01); *E05Y 2900/536* (2013.01)

(58) Field of Classification Search
USPC ......................................... 180/274
See application file for complete search history.

(56) References Cited

U.S. PATENT DOCUMENTS 7,506,716 B1 *    3/2009    Salmon ................... B60R 21/38
                                                            180/274

* cited by examiner

*Primary Examiner* — Paul N Dickson
*Assistant Examiner* — Hilary L Johns
(74) *Attorney, Agent, or Firm* — Lorenz & Kipf, LLP

(57) ABSTRACT

A hood hinge for a motor vehicle includes a first part attached to a vehicle body part and a second part attached to a front hood. A lifting mechanism is configured to extend the attachment parts from a starting position into a cushioning position in which the front hood is raised from the starting position. A limiter exerts a limiting force on the attachment parts for limiting an extension movement thereof. A deformation element deforms when the force of the limiter acts on at least one attachment part. A stop may contact a counter stop for limiting the deformation of the deformation element.

15 Claims, 3 Drawing Sheets

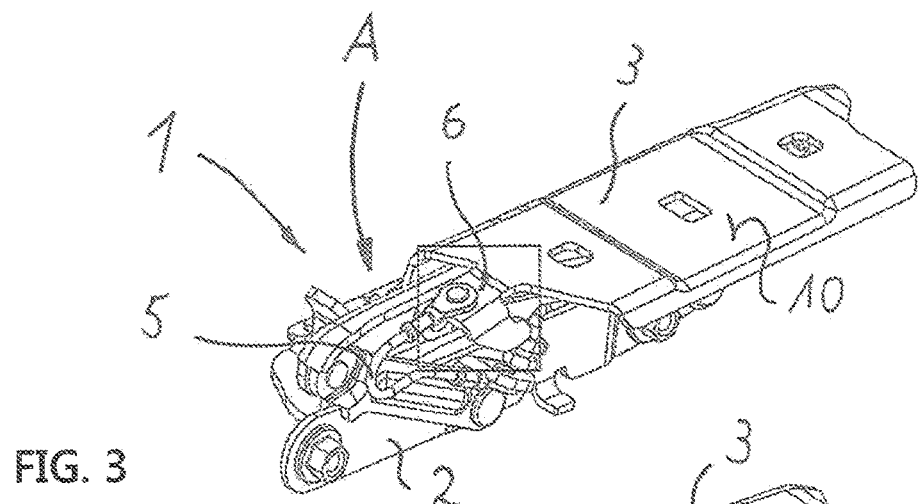
FIG. 3
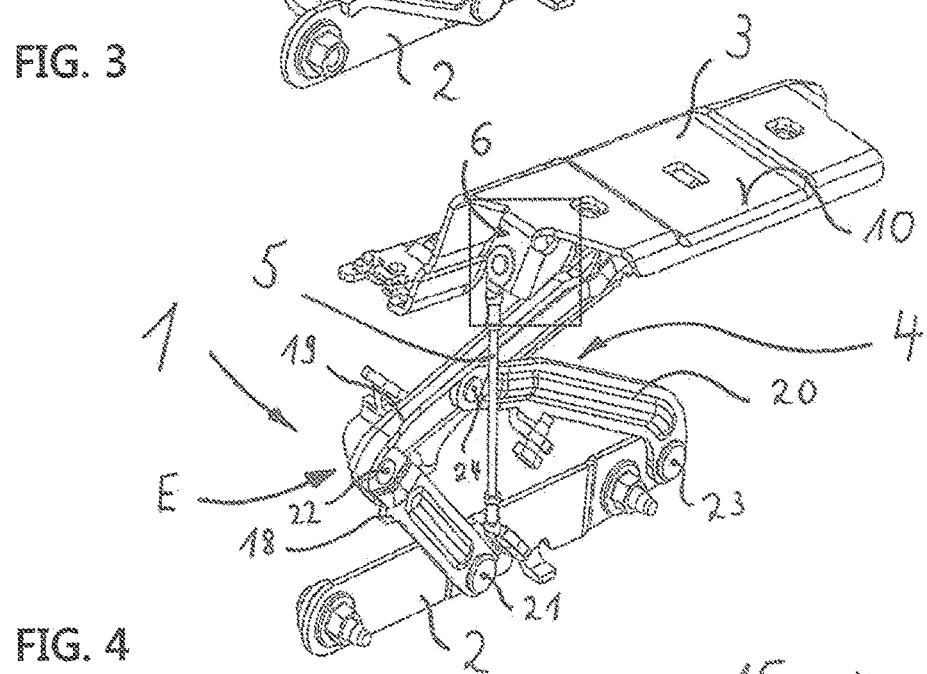
FIG. 4
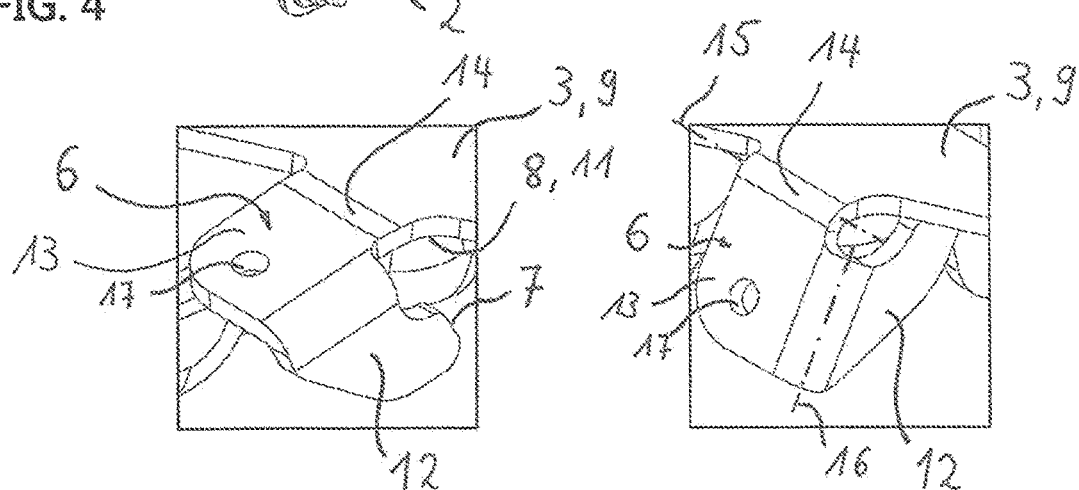
FIG. 5                                         FIG. 6

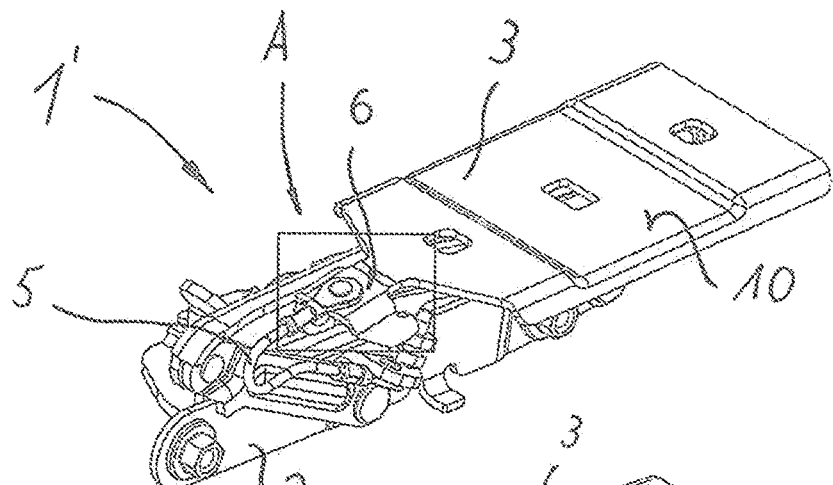
FIG. 7
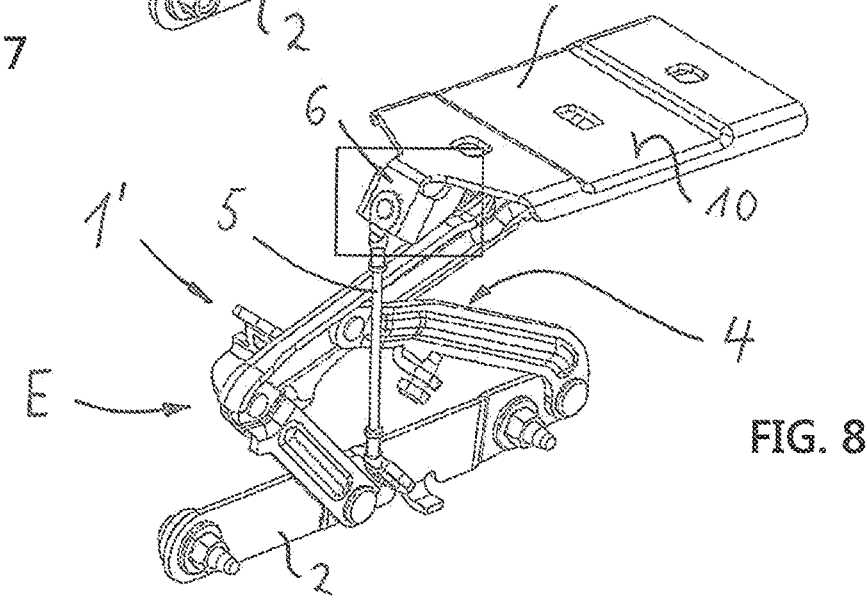
FIG. 8
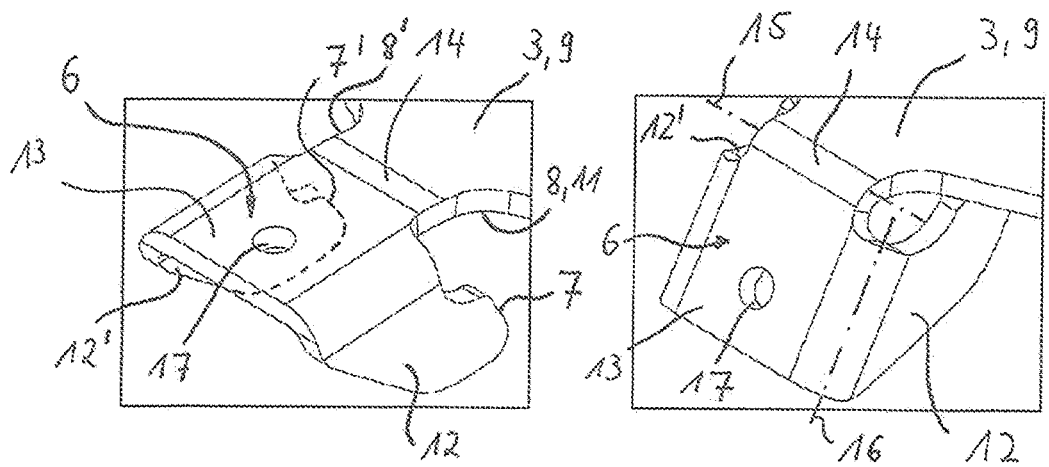
FIG. 9
FIG. 10

HOOD HINGE FOR A MOTOR VEHICLE

CROSS-REFERENCE TO RELATED APPLICATION

This application claims priority to German Patent Application No. 102016010315.9, filed Aug. 25, 2016, which is incorporated herein by reference in its entirety.

TECHNICAL FIELD

The invention relates to a hood hinge for a motor vehicle having two attachment parts, of which one attachment part is designed for supporting and/or fastening to a vehicle body part and the other attachment part is designed for supporting and/or fastening to a front hood of the motor vehicle, having a mechanism, which is operationally connected to the attachment parts and is designed for extending the attachment parts in relation to one another from a starting position into an end position, to raise the front hood from a starting position into a cushioning position for a pedestrian, and having a limiting element, which can exert a limiting force on at least one of the attachment parts, for limiting the extension movement of the attachment parts in relation to one another. The invention furthermore relates to a motor vehicle having such a hood hinge.

BACKGROUND

A hood hinge of the type claimed here is known from DE 10 2010 023 283 A1. The hood hinge has a function in the event of a collision of the motor vehicle with a pedestrian. This is because it permits raising of the front hood from a starting position into a cushioning position for the pedestrian, for example, to moderate the force of the impact of the pedestrian by the front hood. For this purpose, the hood hinge is typically a component of a pedestrian protection system of the motor vehicle, which is activated, for example, via sensorial recognition of an imminent collision or an already occurring collision with a pedestrian and then causes raising of the front hood, for example, by an actuator.

In the development or refinement of such pedestrian protection systems, efforts have been made to cause the extension of the front hood into the cushioning position for the pedestrian as rapidly as possible with respect to time. However, this is frequently made more difficult in that in the end phase of the extension procedure, when a limiting element which limits the extension movement becomes active, the front hood is excited into oscillations because of its mass inertia and the kinetic energy acting during the extension procedure. The desired cushioning position is then only reached after an oscillation-related time delay.

SUMMARY

One embodiment of the invention is based on the object of providing a hood hinge of the type mentioned at the outset, which counteracts possible oscillations of the front hood during the extension movement thereof in the event of a collision of a motor vehicle with a pedestrian.

This object is achieved by a hood hinge which has the features of claim 1. Furthermore, a motor vehicle having the features of claim 15 is proposed to achieve the object. Advantageous embodiments of the invention result from the dependent claims, the following description, and the figures.

According to one embodiment of the invention, a hood hinge for a motor vehicle is provided, which has two attachment parts, of which one attachment part is designed for supporting and/or fastening to a vehicle body part and the other attachment part is designed for supporting and/or fastening to a front hood of the motor vehicle. The hood hinge furthermore has a mechanism, which is operationally connected to the attachment parts and is designed for extending the attachment parts in relation to one another from a starting position into an end position, to raise the front hood from a starting position into a cushioning position for a pedestrian. The hood hinge furthermore has a limiting element, which can exert a limiting force on at least one of the attachment parts, for limiting the extension movement of the attachment parts in relation to one another. The limiting element can exert the limiting force directly or indirectly via an intermediate link on the at least one of the attachment parts.

The hood hinge has a deformation element provided in the force flow of the limiting element, which is designed to execute a deformation when the limiting force of the limiting element acts on the at least one attachment part. Furthermore, at least one stop, which can be brought into contact with a counter stop, is provided for limiting the deformation of the deformation element. For example, the stop is formed on the deformation element and the counter stop is fixed in place with respect to one of the attachment parts.

The front hood is braked during its extension movement by the deformation element before it reaches the cushioning position. For this purpose, the kinetic energy acting during the extension of the front hood is at least partially dissipated by a controlled deformation of the deformation element. Limiting of the further extension movement of the front hood by the limiting element only then occurs. The deformation element enables the front hood to be braked in the end phase of the extension procedure. Therefore, a rapid extension of the front hood with respect to time is to be implemented, wherein shortly before reaching the desired end position of the front hood, in particular the cushioning position, at least a part of the movement energy of the front hood is dissipated as a deformation of the deformation element. The deformation of the deformation element is limited to a predefined amount by the stop and the counter stop interacting therewith. The predefined deformation amount is reached when the stop comes into contact with the counter stop.

It has been shown that possible oscillations of the front hood during the extension, in particular in the end phase of the extension procedure, are substantially avoided or at least reduced by the deformation element and the stop limiting the deformation. This is because a defined damping is achieved which slows the extension movement of the front hood, in particular slows it in the end phase of the extension procedure, so that the end position of the front hood is reached with only lesser kinetic energy or negligible kinetic energy.

It suggests itself that the counter stop be arranged on the one attachment part, in particular immovably arranged. The subject matter may thus be implemented in a technically simple manner. The measure, according to which the counter stop is to be formed on an attachment part, in particular is to be molded on, aims in the same direction. In principle, the counter stop can also be connected to the one attachment part.

According to one embodiment of the invention, the counter stop is formed on a planar outer side, for example, lower side, of a plate-shaped surface section of the one attachment part. The surface section can be formed by a planar outer side, in particular upper side, opposite to the planar outer side, for contact and/or attachment to the front hood. The counter stop is thus formed by a robust and stable component, namely the plate-shaped surface section, so that high deformation forces can also be limited by the counter stop, which can arise during the deformation of the deformation element in the course of the extension of the front hood. At the same time, the subject matter is implemented in a technically simple manner, because for this purpose the surface section is used which is also used at the same time for the contact and/or attachment to the front hood.

According to a further embodiment of the invention, the stop is formed on a material section which is preferably fixedly arranged on an outwardly facing outer side of the deformation element, for example, molded on, and protrudes laterally away therefrom, in particular protrudes away immovably. The stop is thus implemented in a technically simple manner, since the stop is associated with the deformation element provided in any case. An installation advantage thus also results, since the stop is installed at the same time by the installation of the deformation element.

A further embodiment of the invention is that the deformation element has a material section, in particular a tab, or is formed therefrom, wherein the material section is attached or formed via a deformation section on the one attachment part, so that a deformation is caused by a pivot of the material section in relation to the one attachment part about a pivot axis. The deformation element is thus implemented in a technically simple manner, since the deformation element is associated with the attachment part provided in any case. The deformation element additionally uses a deformation which is to be implemented in a simple manner in the course of the extension movement of the front hood. This is because the deformation is caused by a change of the angle of the material section in relation to the attachment part. Such a deformation can be achieved by simply bending over the material section about the pivot axis, so that, for example, the deformation section is formed by a bending section.

The deformation element can be produced in a simple manner if, according to one embodiment of the invention, the pivot axis lies in a plane which is formed by the surface section. The deformation element can thus be produced by a part of the surface section itself. The surface section can have a reduced material thickness or wall thickness in the region of the pivot axis, so that the deformation section formed in the region of the pivot axis is thus favored for deformation.

It suggests itself that the material section itself be formed dimensionally stable. The deformation of the deformation element thus occurs exclusively or at least substantially in the deformation section. It has been shown that the desired controlled and defined deformation of the deformation element is thus favored, since the deformation relates to the deformation section itself and the material section remains protected therefrom, for example.

According to a further embodiment of the invention, the material section having the stop and the material section of the deformation element are located at an angle in relation to one another about a common axis. Limiting of the deformation by means of the stop and the counter stop is thus to be implemented in a technically simple manner, in particular if the deformation is caused by means of angle change of the material section in relation to the attachment part. Due to the angled arrangement of the material section having the stop in relation to the material section of the deformation element, the pivot movement or a pivot movement of the material section of the deformation element about the pivot axis is used to bring the stop into contact against the counter stop. For this purpose, it is provided that the material section having the stop lies at an angle in relation to the material section of the deformation element. In addition, the common axis is to extend transversely in relation to the pivot axis, in particular extend at a right angle in relation to the pivot axis.

It suggests itself that the material section having the stop and the material section of the deformation element form an L shape, in particular form the legs of an L-shaped component. Such an L shape can be implemented in a technically simple manner. For example, the L-shaped component can be an angled component. A simple geometric contour is provided by the L shape.

Furthermore, it suggests itself that the material section having the stop and the material section of the deformation element form a common component, for example, be molded on one another. The deformation element is thus to be produced together with the stop in a simple manner.

A further possible embodiment of the invention is that two stops are provided, which can each be brought into contact with an associated counter stop for limiting the deformation of the deformation element, wherein the stops are formed on the deformation element and the respective associated counter stop is fixed in place with respect to one of the attachment parts. Due to the two stops, limiting of the deformation movement is also possible when relatively high deformation forces act. This is because a particularly stable and durable embodiment is implemented by the two stops and counter stops.

The counter stops can be arranged on the one attachment part, in particular arranged immovably. The subject matter may thus be implemented in a technically simple manner. The measure, according to which the counter stops are to be formed jointly on the one attachment part, in particular molded thereon, is targeted in the same direction. Fundamentally, the counter stops can also be connected to the one attachment part.

According to a further embodiment of the invention, the counter stops are formed jointly on a planar outer side, in particular lower side, of a plate-shaped surface section of the one attachment part, wherein the surface section is formed having a planar outer side opposite to the outer side for contact and/or attachment to the front hood. The counter stops are thus formed by a robust and stable component, namely the plate-shaped surface section, so that high deformation forces can be limited by the counter stops, which can arise during the deformation of the deformation element in the course of the extension of the front hood. At the same time, the subject matter is implemented in a technically simple manner, because the surface section, which is also used at the same time for the contact and/or attachment to the front hood, is used for this purpose.

According to a further embodiment of the invention, the stops are each formed on a material section which is arranged on an outwardly facing outer side of the deformation element, in particular fixedly arranged, for example, molded thereon, and protrudes laterally away therefrom, in particular protrudes away immovably. The stops are thus implemented in a technically simple manner, since the stops are associated with the deformation element provided in any case. An installation advantage also thus results, since the stops are installed at the same time by the installation of the deformation element.

A further embodiment of the invention is that the deformation element has a material section, in particular a tab, or is formed therefrom, wherein the material section is attached or molded via a deformation section on the one attachment part, so that a deformation is caused by pivoting the material section in relation to the one attachment part about a pivot axis. The deformation element is thus implemented in a technically simple manner, since the deformation element is associated with the attachment part provided in any case. The deformation element additionally uses a deformation which is simple to implement in the course of the extension movement of the front hood. This is because the deformation is caused by a change of the angle of the material section in relation to the attachment part. Such a deformation can be achieved by simply bending over the material section about the pivot axis, so that, for example, the deformation section is formed by a bending section.

The deformation element can be produced in a simple manner if, according to one embodiment of the invention, the pivot axis lies in a plane which is formed by the surface section. The deformation element can thus be produced by a part of the surface section itself. The surface section can have a reduced material thickness or wall thickness in the region of the pivot axis, so that the deformation section formed in the region of the pivot axis is thus also favored for deformation.

It suggests itself that the material section itself be formed dimensionally stable. The deformation of the deformation element is thus located exclusively or at least substantially in the deformation section. It has been shown that the desired controlled and defined deformation of the deformation element is thus favored, since the deformation relates to the deformation section itself and the material section remains protected therefrom, for example.

According to a further embodiment of the invention, in each case the material section having the stop and the material section of the deformation element are located at an angle in relation to one another about a common axis. Limiting of the deformation by means of the stops and the counter stops is thus to be implemented in a technically simple manner, in particular if the deformation is caused by means of angle change of the material section in relation to the attachment part. Due to the angled arrangement of the material sections having the stops in relation to the material section of the deformation element, the pivot movement or a pivot movement of the material section of the deformation element about the pivot axis is used to bring the stops into contact against the counter stops. For this purpose, in each case the material section having the stop lies at an angle in relation to the material section of the deformation element. In addition, in each case the common axis is to extend transversely in relation to the pivot axis, in particular extend at a right angle in relation to the pivot axis.

It suggests itself that the material sections having the stops and the material section of the deformation element form a U shape, wherein the material sections having the stops form the lateral legs of the U shape. The deformation element having the stops is thus implemented in a technically simple manner. This is because the geometrically simple contour of a U shape is used.

Furthermore, it suggests itself that the material sections having the stops and the material section of the deformation element form a common component, in particular be molded on one another. The deformation element is thus to be produced together with the stop in a simple manner.

The one attachment part, which is associated with the deformation part and/or the at least one counter stop, can be, according to one embodiment of the invention, the attachment part formed for support and/or fastening to the front hood of the motor vehicle. The counter stop and the deformation element can thus be used in a simple manner while utilizing a planar material section if the attachment part for application and/or support to the front hood itself already has a planar material section, which can then be used for the formation of the deformation element and/or the counter stop. In principle, the deformation element and/or the counter stop can also be associated with the other attachment part.

According to a further embodiment of the invention, the limiting element is a cable pull or has a cable pull. In a technically simple manner, the hood hinge thus executes an extension movement from the starting position into the end position, wherein the deformation element is first impinged shortly before reaching the end position and a deformation and therefore braking of the extension movement of the front hood occurs. This is because the impingement of the deformation element first occurs when the cable pull is tensioned and thus a traction force is caused by the cable pull on the deformation element.

By the selection of the length of the cable pull, it is possible to set the extension distance of the one attachment part in relation to the other attachment part of the hood hinge after which tensioning of the cable pull and therefore a force impingement of the deformation element occurs. It suggests itself that the cable pull be connected at its one end to the deformation element and be connected at its other end to the attachment part, in particular be connected to the attachment part which is designed for support and/or fastening to vehicle body part.

According to a further embodiment of the invention, the mechanism is or has a multiple joint, in particular a multiple pivot joint, which is designed for pivoting the front hood from a closed position into an open position. The mechanism thus has a double function. On the one hand, it is used for pivoting the front hood and, on the other hand, it is used in case of a crash with a pedestrian for extending the front hood into the cushioning position for the pedestrian.

For example, the mechanism has at least two lever parts, of which one lever part is linked to one of the attachment parts and the other lever part is linked to the other attachment part so they are each rotatable about a rotational axis and the lever parts are linked to one another so they are rotatable about a rotational axis. The mechanism can also have a further lever part, which is linked on one side to one of the attachment parts so it is rotatable about a rotational axis and is linked on the other side to the lever part, which is linked to the other of the attachment parts so it is rotatable, so it is rotatable about a rotational axis.

Furthermore, the invention comprises a motor vehicle having at least one vehicle body part, a front hood, and at least one hood hinge, as described above, by means of which the front hood is attached to the vehicle body part.

A hood hinge is proposed by the invention, by which an effective pedestrian protection system for a motor vehicle can be implemented in the region of its front hood. The hood hinge permits an extension movement of the front hood into a cushioning position for the pedestrian, without oscillations of the front hood occurring, due to which an undesired time delay can occur during the extension of the front hood. Possible oscillations of the front hood during its extension movement are at least reduced by the hood hinge. For this purpose, the invention uses a defined deformation, by which the extension movement of the front hood is braked shortly before reaching the cushioning position. Furthermore, the invention uses a stop, by which the deformation movement is limited. A measure is taken by the combination of the deformation and the limiting of the deformation, by which the front hood can be brought into the cushioning position without appearances of oscillations of the front hood occurring in the end phase of the extension movement. Possible appearances of oscillations of the front hood are at least reduced. A precise and controlled extension movement of the front hood is thus achieved.

Further goals, advantages, features, and possible applications of the present invention result from the following description of two exemplary embodiments on the basis of the drawing. In this case, all features which are described and/or illustrated in the figures form the subject matter of the present invention per se or in any arbitrary reasonable combination, also independently of the summary thereof in the claims or what they refer to.

BRIEF DESCRIPTION OF THE DRAWINGS

The present invention will hereinafter be described in conjunction with the following drawing figures, wherein like numerals denote like elements.

FIG. 3 shows a possible embodiment of a hood hinge in a perspective illustration, which is usable for extending the front hood of the motor vehicle according to FIG. 1, in a starting state, FIG. 4 shows the hood hinge according to FIG. 3 in an extended state, FIG. 5 shows an enlarged illustration of the hood hinge of FIG. 3 in the region of a deformation element, FIG. 6 shows an enlarged illustration of the hood hinge of FIG. 4 in the region of a deformation element, FIG. 7 shows a further possible embodiment of a hood hinge in a perspective illustration, which is usable for extending the front hood of the motor vehicle according to FIG. 1, in a starting state, FIG. 8 shows the hood hinge according to FIG. 7 in an extended state, FIG. 9 shows an enlarged illustration of the hood hinge of FIG. 7 in the region of a deformation element, and FIG. 10 shows an enlarged illustration of the hood hinge of FIG. 8 in the region of a deformation element.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
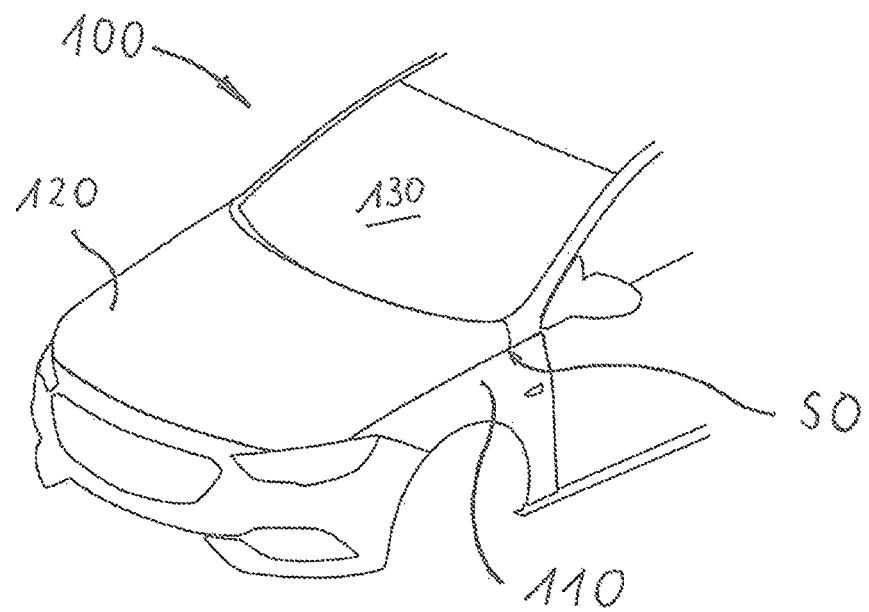
FIG. 1 shows a possible embodiment of a motor vehicle having an extendable front hood in a perspective illustration, wherein the front hood is provided in a starting position.

FIG. 1 shows—in a schematic illustration—a possible embodiment of a motor vehicle 100 as a detail in the region of the front section. The motor vehicle 100 is shown with its front hood 120. In FIG. 1, the front hood 120 is located in a starting position S0, in which the front hood 120 is closed. The front hood 120 rests on the lateral fenders, for example. The lateral fenders are referred to by way of example as a vehicle body part 110. The motor vehicle 100 has a pedestrian protection system (not shown in FIG. 1), by means of which the front hood 120 is activated, for example, by sensorial recognition of an imminent collision or an already occurring collision with the pedestrian and then, for example, raising of the front hood 120 takes place by an actuator. The raising of the front hood 120 occurs, for example, in the region of the rear end of the front hood 120, which faces toward the windshield 130 of the motor vehicle 100.

Figure 2:
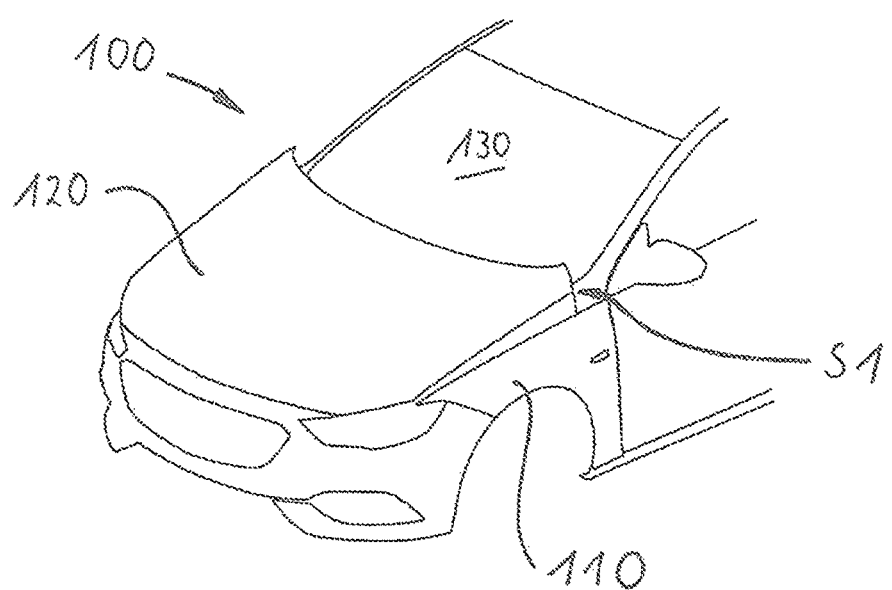
FIG. 2 shows the motor vehicle according to FIG. 1, wherein the front hood thereof is located in a cushioning position for a pedestrian.

FIG. 2 shows the motor vehicle 100 with extended or raised front hood 120. The front hood 120 is located there in a cushioning position S1, which is reached when the extension movement of the front hood is completed. In the cushioning position S1, the front hood 120 is raised in the end position for cushioning a pedestrian colliding with the motor vehicle 100.

FIG. 3 shows a possible embodiment of a hood hinge 1, which is, for example, a component of the system of the motor vehicle 100 according to FIGS. 1 and 2 and is used so that the front hood 120 can be raised from the starting position S0 into the cushioning position S1 for the pedestrian.

The hood hinge 1 has two attachment parts 2 and 3, of which one attachment part 2 is designed for support and/or attachment to a vehicle body part, for example, the vehicle body part 110, and the other attachment part 3 is designed for support and/or attachment to a front hood, for example, the front hood 120. The hood hinge 1 furthermore has a mechanism which is operationally connected to the attachment parts 2, 3 and is designed for extending the attachment parts 2, 3 in relation to one another from a starting position A into an end position E, to raise the front hood 120 from the starting position S0 into the cushioning position S1 for a pedestrian. In FIG. 3, the hood hinge 1 is shown in the starting position A. FIG. 4 shows the hood hinge 1 in the end position E.

The mechanism 4 can have at least two levers parts 18, 19, of which the lever part 18 is linked to the attachment part 2 and the lever part 19 is linked to the attachment part 3 so they are each rotatable about a rotational axis 21 and the levers parts 18, 19 are linked to one another so they are rotatable about a rotational axis 22. The mechanism 4 can also have a further lever part 20, which is linked on one side on the attachment part 2 so it is rotatable about a rotational axis 23 and is linked on the other side on the lever part 19 so it is rotatable about a rotational axis 24.

As is apparent from FIGS. 3 and 4, the hood hinge 1 has a limiting element 5 for limiting the extension movement of the attachment parts 2, 3 in relation to one another. For this purpose, the limiting element 5 exerts a limiting force on at least one of the attachment parts 2, 3. For example, the limiting element 5 is designed as a cable pull. For example, the limiting element 5 is connected on one side to the attachment part 3 and on the other side to the attachment part 2. If the limiting element 5 is designed as a cable pull, the length of the cable pull is dimensioned such that the cable pull is provided relaxed in the starting position A of the hood hinge 1 (FIG. 3) and therefore no limiting force is exerted on the attachment parts 2, 3, but in the end position E, the cable pull is then provided tensioned (FIG. 4), thus exerts a limiting force on the attachment parts 2, 3, and therefore the extension movement of the attachment parts 2, 3 in relation to one another is limited.

Furthermore, the hood hinge 1 has a deformation element 6 provided in the force flow of the limiting element 5, which is designed to execute a deformation when the limiting force of the limiting element 5 acts on the at least one attachment part, preferably the attachment part 3.

FIG. 5 shows the hood hinge 1 located in the starting position A in an enlarged detail in the region of the deformation element 6. FIG. 6 shows the hood hinge 1 located in the end position E in an enlarged detail, also in the region of the deformation element 6. The limiting element 5 is omitted in FIGS. 5 and 6. Only an attachment point 17 for attaching the limiting element 5 is shown therein. The limiting element 5 is fastened on one side thereon in FIGS. 3 and 4. The attachment point 17 can be a through opening, in particular a through borehole.

As is apparent in particular from FIGS. 5 and 6, the hood hinge 1 has a stop 7, which is used for limiting the deformation of the deformation element 6 and is brought into contact against a counter stop 8 for this purpose. The stop 7 is formed on the deformation element 6. The counter stop 8 is fixed in place with respect to one of the attachment parts 2, 3, preferably with respect to the attachment part 3, which is designed for support and/or fastening to the front hood 130.

The attachment part 3 preferably has a plate-shaped surface section 9 having two opposing planar outer sides 10, 11, i.e., which are located opposite to one another, of which one planar outer side 10 is designed for contact and/or attachment to the front hood 120 and the counter stop 8 is formed on the other planar outer side 11. For example, the planar outer side 10, which is designed for contact and/or attachment to the front hood 120, is an upper side and the other planar outer side 11 is a lower side of the plate-shaped surface section 9.

For example, the stop 7 is formed on a material section 12, which is arranged on a downwardly facing outer side of the deformation element 6 and protrudes laterally away therefrom. The material section 12 can be molded onto the outwardly facing outer side of the deformation element 6. It preferably protrudes laterally outward immovably away from the deformation element 6.

As is apparent from FIGS. 3 to 6, the deformation element 6 can have a material section 13, in particular a dimensionally-stable material section 13, and a deformation section 14. For example, the material section 13 is attached or molded via the deformation section 14 on the attachment part 3, so that a deformation is caused by a pivot of the material section 13 in relation to the attachment part 3 about a pivot axis 15. The deformation is therefore induced by a change of the angle of the material section 13 in relation to the attachment part 3. The pivot axis 15 is thus located in the region of the deformation section 14.

The pivot axis 15 is preferably located in the plane which is formed by the planar section 9 of the attachment part 3. The material section 13 of the deformation element 6 and the material section 12, which has the stop 7, are preferably located at an angle in relation to one another about a common axis 16 (FIG. 6). The axis 16 preferably extends in this case transversely in relation to the pivot axis 15, for example, the axis 16 extends at a right angle in relation to the pivot axis 15. For example, the material section 12 of the deformation element 6 and the material section 13, which has the stop 7, form a common component, in particular are molded on one another, wherein the material sections 12, 13 preferably have an L shape.

To extend the attachment parts 2 and 3 of the hood hinge 1 away from one another from the starting position A into the end position E, the mechanism 4 provided for this purpose can be formed by a multiple joint, for example, a multiple pivot joint, which is also designed, for example, for pivoting the front hood 130 from a closed position into an open position, to make the front space covered by the front hood 120, in particular the engine compartment, accessible. For example, the multiple joint is a fourfold joint. The two functions can thus be unified in the one hood hinge 1, namely, on the one hand, causing the extension of the front hood 120 from the starting position S0 into the cushioning position S1 (cf. FIGS. 1 and 2) and, on the other hand, permitting pivoting of the front hood 120 from the closed position into the open position.

The following possible functionality results for the hood hinge 1: Upon activation of the pedestrian protection system of the motor vehicle 100 and an activation of an actuator linked thereto, raising of the front hood 120 from its starting position S0 occurs, by the actuator moving the attachment parts 2, 3 of the hood hinge 1 away from one another originating from the starting position A. This extension movement of the attachment parts 2 and 3 in relation to one another takes place over such an extension distance until the limiting element 5 exerts a limiting force to prevent a more extensive extension movement of the attachment parts 2, 3 in relation to one another.

The deformation element 6 arranged in the force flow of the limiting element 5 is impinged by the acting limiting force and causes a deformation of the deformation element 6, by a deformation occurring due to an angle change, for example, by the material section 13 being bent about the pivot axis 15 in relation to the surface section 9. In the course of this deformation, the attachment parts 2, 3 are braked in the extension movement thereof. At the end of this braking procedure, the stop 7 comes into contact against the counter stop 8. As soon the stop 7 strikes against the counter stop 8, the deformation of the deformation element 6 is ended and the attachment parts 2 and 3 have reached the end position E thereof in relation to one another.

FIG. 7 shows a further possible embodiment of a hood hinge 1' in the starting position A. FIG. 8 shows the hood hinge 1' in the end position E. FIG. 9 shows the hood hinge 1' located in the starting position A in an enlarged detail in the region of the deformation element 6. FIG. 10 shows the hood hinge 1' located in the end position E in an enlarged detail, also in the region of the deformation element 6.

The starting position A and the end position E preferably correspond to the starting position A and the end position E as already described for the embodiment of the hood hinge 1 of FIGS. 3 to 6. Components of the hood hinge 1' of FIGS. 7 to 10 which are identical or functionally identical to components of the hood hinge 1 of FIGS. 3 to 6 are provided with identical reference signs; reference is made in this regard to the description of the hood hinge 1 of FIGS. 3 to 6.

The hood hinge 1' of FIGS. 7 to 10 differs from the hood hinge 1 of FIGS. 3 to 6, inter alia, in that in addition to the stop 7, a further stop 7' is provided. The further stop 7' is formed on a material section 12', which is arranged on an outwardly facing outer side of the deformation element 6, for example, molded thereon, and protrudes laterally away therefrom. The material section 12 which has the stop 7 and the material section 12' which has the stop 7' form a U shape together with the material section 13 of the deformation element 6, wherein the material sections 12, 12', which each have the one stop 7 or 7', respectively, form the lateral legs of the U shape.

A counter stop 8' interacting with the further stop 7' is formed in the same manner as the counter stop 8 on the surface section 9, in particular provided on the outwardly facing outer side of the surface section 9.

Since only one or more exemplary embodiments were described above, it is to be clarified that in principle a variety of variations and deviations are possible. Furthermore, it is to be clarified that the described embodiments only represent examples, which do not restrict the scope of protection, the applicability, or the construction. Rather, the abstract and the described embodiments merely represent a practical introduction for a person skilled in the art, on the basis of which a person skilled in the art can arrive at at least one exemplary embodiment. In this case, it is self-evident to a person skilled in the art that various modifications can be performed with respect to the function and the arrangement of the elements described with reference to the exemplary embodiments, without deviating from the scope of the appended patent claims and the equivalents thereof.

The invention claimed is:

1. A hood hinge for a motor vehicle comprising:
   a first hinge member configured to attach to a body part of the motor vehicle;
   a second hinge member configured to attach to a front hood of the motor vehicle;
   a lifting mechanism operationally connected to the first and second hinge members and configured to extend the first member relative to the second hinge member from a starting position into an end position for raising the front hood from a lowered position into a cushioning position;
   a limiter configured to exert a force on at least one of the first and second hinge members for limiting an extension movement of the first hinge member in relation to the second hinge member;
   a deformation element associated with the limiter and configured to deform when the force of the limiter acts on the at least one of the first and second hinge members; and
   a stop mechanism having a first stop configured to contact against a first counter stop for limiting deformation of the deformation element.

2. The hood hinge according to claim 1, wherein the second hinge member comprises a plate-shaped surface section having a first outer side configured to contact the front hood and a second outer side having the first stop formed thereon.

3. The hood hinge according to claim 2, wherein the first stop is formed on an outwardly facing side of the deformation element and protrudes laterally away therefrom.

4. The hood hinge according to claim 1, wherein the deformation element comprises a material section coupled to a deformation section on the second hinge member, wherein a deformation is caused by a pivot of the material section in relation to the second hinge member about a pivot axis.

5. The hood hinge according to claim 4, wherein the material section having the stop and the deformation element lie at an angle in relation to one another about a common axis extending transversely in relation to the pivot axis.

6. The hood hinge according to claim 5, wherein the material section having the stop and the deformation element form an L shape.

7. The hood hinge according to claim 1, wherein the stop mechanism further comprises a second stop configured to contact against a second counter stop for limiting deformation of the deformation element, wherein the first and second stops are formed on the deformation element and the first and second counter stop are fixed in place with respect to one of the first and second hinge members.

8. The hood hinge according to claim 7, wherein the second hinge member comprises a plate-shaped surface section having a first outer side configured to contact the front hood and the first and second counter stops are formed on a second outer side thereof.

9. The hood hinge according to claim 8, wherein the first and second stops are each formed on a material section arranged on an outwardly facing outer side of the deformation element and protrudes laterally away therefrom.

10. The hood hinge according to claim 9, wherein the deformation element comprises a material section on the second hinge member via a deformation section, such that deformation is caused by pivot of the material section in relation to the second hinge member about a pivot axis.

11. The hood hinge according to claim 10, wherein the material section having the first and second stops and the deformation element lie at an angle in relation to one another about a common axis extending transversely to the pivot axis.

12. The hood hinge according to claim 10, wherein the material sections having the first and second stops and the deformation element form a U shape, wherein the material sections having the first and second stops form lateral legs of the U shape.

13. The hood hinge according to claim 1, wherein the limiting element comprises a cable pull.

14. The hood hinge according to claim 1, wherein the lifting mechanism comprises a multiple joint mechanism configured to pivot the front hood from the lowered position into an open position.

15. A motor vehicle comprising:
   a body part;
   a front hood; and
   a hinge assembly including:
      a first hinge member attached to the body part of the motor vehicle;
      a second hinge member attached to the front hood;
      a lifting mechanism operationally connected to the first and second hinge members and configured to extend the first member relative to the second hinge member from a starting position into an end position for raising the front hood from a lowered position into a cushioning position,
      a limiter configured to exert a force on at least one of the first and second hinge members for limiting an extension movement of the first hinge member in relation to the second hinge member;
      a deformation element associated with the limiter and configured to deform when the force of the limiter acts on the at least one of the first and second hinge members; and
      a stop mechanism having a first stop configured to contact against a first counter stop for limiting deformation of the deformation element.

* * * * *